Figure 1:
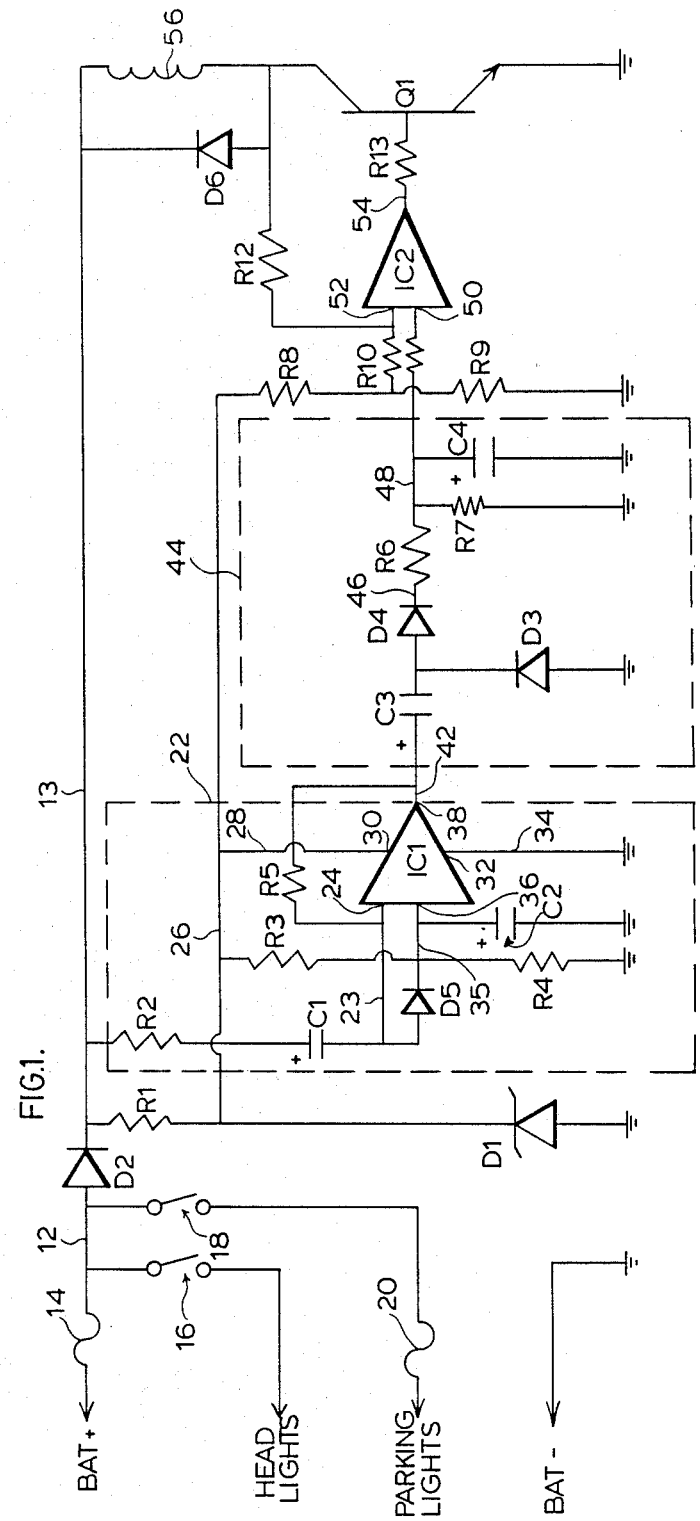

United States Patent [19]

Heintzberger et al.

[11] Patent Number: 4,831,310

[45] Date of Patent: May 16, 1989

[54] AUTOMATIC HEADLIGHT CONTROL SYSTEM

[76] Inventors: Antonius H. Heintzberger, Box 204, R.R. #2, Kettleby, Ontario L0G 1J0; John Melia, 3312 Twilight Road, Mississauga, Ontario L4T 1Z9, both of Canada

[21] Appl. No.: 94,616

[22] Filed: Sep. 9, 1987

[30] Foreign Application Priority Data

Sep. 9, 1986 [GB] United Kingdom ............... 8621672

[51] Int. Cl.$^4$ ............................................. B60Q 1/02
[52] U.S. Cl. ........................................ 315/77; 315/82; 315/83; 315/76; 307/10.8
[58] Field of Search ............... 315/82, 83, 77, 76, 315/191; 307/10 LS, 10 R; 340/76

[56] References Cited

U.S. PATENT DOCUMENTS

| 3,447,029 | 5/1969 | Dill | 315/82 |
| 3,702,415 | 11/1972 | Schultz | 315/83 |
| 3,706,006 | 12/1972 | Miller, Jr. | 315/83 |
| 3,774,071 | 11/1973 | Goodrich | 315/83 |
| 3,775,640 | 11/1973 | English | 315/83 |
| 3,798,500 | 3/1974 | Florence et al. | 315/82 |
| 3,909,619 | 9/1975 | Kniesly et al. | 315/83 |
| 3,963,940 | 6/1976 | Adamian | 315/83 |
| 4,117,453 | 9/1978 | Hodgson et al. | 315/83 |
| 4,376,909 | 3/1983 | Tagami et al. | 315/83 |

Primary Examiner—David K. Moore
Assistant Examiner—Michael Razavi
Attorney, Agent, or Firm—Robert F. Delbridge; Arne I. Fors

[57] ABSTRACT

Apparatus for causing an external light system of a motor vehicle to be actuated when the vehicle engine is running, the vehicle having an electrical battery associated with the engine, and the running of the engine causing an AC signal to appear with a DC component at a terminal of the battery. The apparatus has an electrical circuit with a filter for filtering the DC component from the AC signal to provide a filtered AC signal indicating an engine running condition. The filtered AC signal or other engine running signal obtained from the filtered AC signal is compared with a predetermined value and an actuating signal is provided when the engine running signal is above the predetermined value. An actuator responsive to receipt of the actuating signal causes the external light system of the vehicle to be turned on.

5 Claims, 1 Drawing Sheet

AUTOMATIC HEADLIGHT CONTROL SYSTEM

This invention relates to apparatus for causing external lights of a motor vehicle to be actuated when the vehicle engine running.

Many prior proposals have been made to enable the headlamps of a motor vehicle to be automatically turned on in response to an electrical signal associated with the vehicle engine when the engine is running. Typical prior proposals are shown for example in U.S. Pat. No. 3,397,342 (Dill) issued Aug. 13, 1968, U.S. Pat. No. 3,447,029 (Dill) issued May 27, 1969, U.S. Pat. No. 3,706,005 (Carlson) issued Dec. 12, 1972, U.S. Pat. No. 3,769,515 (Adamian) issued Oct. 13, 1973 and U.S. Pat. No. 3,963,940 (Adamian) issued June 15, 1976. The first three patents disclose systems which cause electrical power to be provided to the headlamps from a generator when the engine is running, and the last two patents disclose systems responsive to ignition pulses taken off the primary coil of the ignition system of the vehicle to cause the headlamps to be turned on. However, for one reason or another, none of these prior proposals are particularly satisfactory in practice. Among other reasons, for example, such proposals are not easy for a vehicle owner to install.

It is therefore an object of the invention to provide automatic external light control apparatus for motor vehicles which is relatively simple for a vehicle owner to install.

The present invention is based on the realization that effective control of external lights of the vehicle can be effected by utilization of AC signals which are imposed on the DC voltage at a terminal of the vehicle battery, for example, AC signals emanating from the vehicle alternator and spark plug firing.

According to the invention, automatic external light control apparatus comprises an electrical circuit including means for filtering out the DC component from the AC signal which appears with the DC component at a terminal of the battery when the vehicle engine is running to provide a filtered AC signal indicating an engine running condition, comparing means for comparing the filtered AC signal or other engine running signal obtained from the filtered AC signal with a predetermined value and providing an actuating signal when the engine running signal is above the predetermined value, and actuating means responsive to receipt of the actuating signal to cause the external light of the vehicle to be turned on.

The apparatus may also include time delay means to delay provision of the actuating signal for a predetermined time after the vehicle engine has started running.

The apparatus may also include time delay means to maintain the provision of the actuating signal for a predetermined time after the vehicle engine has stopped running.

The comparing means may provide an actuating signal when the engine running signal rises above a first predetermined value and cease to provide the actuating signal when the DC signal falls below a second predetermined value lower than the first predetermined value.

The apparatus may also include means for rectifying the AC signal, which may first be amplified, to provide a DC engine running signal.

The external light system actuated may comprise head lights (including fog lights) and parking lights (including track lights).

One embodiment of the invention will now be described with reference to the accompanying drawing, which shows an electrical circuit diagram of automatic external light control apparatus.

Referring to the drawing, automatic external light control apparatus in accordance with a preferred embodiment of the invention has a positive line 12 which in use is connected through a fusible link 14 to the positive terminal of the vehicle battery, which will normally be a 12 volt battery. The positive line 12 is also connected to use to the head lights of the vehicle through normally-open relay contacts 16 and to the parking lights (including tail lights) of the vehicle through normally-open relay contacts 18 and a fuse 20.

The positive line 12 is connected through a diode D2 and a further positive line 13 to protect the circuitry to be described from negative voltage which may be applied for example if positive line 12 is inadvertently connected during installation to the negative terminal of the battery instead of through the positive terminal.

Protection against high transient positive voltage is provided by resistor R1 and Zener diode D1 set at 10 volts and connected in series between the cathode side of diode D2 in the positive line 13 and ground.

The positive line 13 is connected to a portion of the circuit which functions as an AC gain section 22. In the AC gain section 22, the positive line 13, is connected through resistor R2, capacitor C1 and line 23 to an input 24 of an integrated circuit operational amplifier IC1. A positive line 26 is connected to a point between resistor R1 and Zener diode D1 and by line 28 to another terminal 30 of amplifier IC1, the opposite terminal to terminal 32 being connected to ground via line 34.

Resistors R3 and R4 of equal value are connected in series between second positive line 26 and ground, such that the junction of resistors R3 and R4 is maintained at a constant voltage which is half the voltage of Zener diode D1, namely 5 volts. The constant voltage junction between resistors R3 and R4 is connected by line 35 to the other input 36 of amplifier IC1. A diode D5 is connected between capacitor C1 and the constant voltage junction between resistors R3, R4 for transient protection, and a capacitor C2 is connected between constant voltage line 35 and ground to provide an AC ground path for the amplifier AC input. A resistor R5 is connected between input 24 and output 38 of amplifier RC1, with the value of resistor R5 being one hundred times the value of resistor R2 to set the gain of amplifier IC1 at 100.

The output terminal 38 of amplifier IC1 is connected through line 42 to rectifier and integrator section 44. The rectifier portion of the section 44 comprises capacitor C3 and diode D4 connected in series to line 42, and a diode D3 connected between the junction of capacitor C3 and diode D4 and ground. The amplified and rectified signal then passes along line 46 to the integrator portion comprising resistor R6 connected between line 46 and line 48, and resistor R7 and capacitor C4 connected in parallel between line 48 and ground. Line 48 is connected through resistor R11 to an input 50 of an integrated to circuit comparator IC2 to supply the integrated signal thereto.

Resistors R8 and R9 are connected between positive line 26 and ground, with the junction between resistors R8, R9 being connected through resistor R10 to another input 52 of comparator IC2. The relative values of resistors R8, R9 set the voltage of the junction therebetween and therefore the threshold value for comparator IC2. The output of comparator IC2 is connected through line 54 and resistor R13 to the base of a transistor switch Q1. A relay coil 56 is connected between positive line 13 and the collector of switch Q1, whose emitter is connected to ground.

A resistor R12 is connected between input 52 of comparator IC2 and the collector of switch Q1. Resistors R10 and R12 provide a desired hysteresis for comparator IC2 as will be explained in more detail later. Diode D6 is connected across relay coil 56 for transient protection.

In use of the above described external light control apparatus, appropriate connections are made to the vehicle battery, head lights and parking lights are previously described and as shown in the drawing. It will be readily appreciated that such connections can easily be made by a relatively unskilled person with appropriate instructions.

When the external light control apparatus is connected to the vehicle and the engine is not running, DC voltage will be present in the positive lines 12, 13 and 26, the input 36 of amplifier IC1 and input 52 of comparator IC2. However, capacitor C1 prevents DC voltage from being applied to amplifier IC1 and hence also to comparator IC2. Accordingly, there will be no output from comparator IC2 with a result that switch 21 is in an open condition and relay coil 56 is not energized.

When the engine is started, AC voltages will be imposed on the DC voltage at the positive battery terminal. With an internal combustion engine having spark plugs and an alternator, such AC voltages would primarily be caused by alternator ripple and ignition noise produced by operation of the spark plugs.

The AC signal, which typically may have an amplitude of the order of 100 mV will be applied to input 24 of amplifier IC1, the DC component having been filtered out by capacitor C1. As previously mentioned, in this embodiment, the amplifier again is set at 10°, so that the AC signal from amplifier IC1 would have an amplitude of the order of 10 volts. This signal is then rectified in the rectifier portion of circuit section 44 to provide a DC signal which, because of some voltage loss, will have an amplitude of the order of 4 volts.

The DC signal then passes to the integrator portion of circuit section 44, which also acts as a timer. The value of resistor R6 controls the charge time of capacitor C4 and, in this embodiment, the value is chosen so that the charge time of capacitor C4 is about 3 seconds. In other words, if the DC signal from the rectifier portion is not present for at least 3 seconds, the voltage applied to input 50 of comparator IC2 does not reach the threshold value. Assuming that the engine continues to run, the voltage reaches the desired value, which is about 2 volts in this embodiment, to cause the comparator IC2 to emit an output signal which turns on switch 21 to energize relay coil 56. Relay contacts 16, 18 then close with the result that the head lights and parking lights of the vehicle are turned on and remain on while the engine is running.

When the engine is switched off, the AC signal at the input 36 of amplifier IC1 ceases. The integrated DC signal at input 50 of comparator IC2 then starts to decay. The values of resistors R10, R12 are chosen so that the hysteresis of comparator IC2 is such that the comparator output does not cease until the input signal at input 50 has fallen to about 1 volt (as compared to about 2 volts for turn on). Also, the value of resistor R7 is chosen so that the signal voltage takes about 12 seconds to fall to 1 volt. Thus the head lights and parking lights remain on for about 12 seconds after the engine is switched off, thereby providing a suitable time for the driver to leave the vicinity of the vehicle.

After 12 seconds, output from comparator IC2 ceases, and switch 21 opens to de-energize relay coil 56. Relay contact 16, 18 then open to switch off the head lights and parking lights.

The advantages of the present invention will be readily apparent from the foregoing description of a preferred embodiment. In addition to ease of installation in the vehicle, the described embodiment has a number of other advantages.

Because of the time delay of about 3 seconds between amplification of an AC signal and turn on of the lights, the lights will not be turned on by a transient AC signal such as might be caused for example by operation of power door locks when the engine is not running. The time delay of about 12 seconds between engine stopping and lamp turn off also has an advantage if the engine fails at night. The 12 second time delay gives ample time for the vehicle to be brought safely to a stop with the aid of the head lights or for the operator to turn on the lights by means of the manually operated switch normally provided.

The hysteresis associated with the comparator IC2 has the advantage for example that, once the lamps have been turned on, they are not turned off if the AC signal falls somewhat when the engine is running, for example if the associated wiring is in a poor condition.

A further advantage is then the tail lights are switched on as well as the head lights.

Other embodiments and advantages of the invention will be readily apparent from the forgoing description, the scope of the invention being defined in the appended claims.

What we claim as new and desire to protect by Letters Patent of the United States is:

1. Apparatus for causing an external light system of a motor vehicle to be actuated when the vehicle engine is running, said vehicle having an electrical battery associated with the engine, and the running of the engine causing an AC signal to appear with a DC component at a terminal of the battery, said apparatus comprising an electrical circuit including:

connecting means connectible to a terminal of the battery to pick up the AC signal and DC component, means for filtering the DC component from the AC signal picked up by the connecting means at the battery terminal to provide a filtered AC signal indicating an engine running condition, means for amplifying the filtered AC signal, comparing means for comparing the amplified filtered AC signal or other engine running signal obtained from the amplified filtered AC signal with a predetermined value and cease to provide the actuating signal when the engine running signal falls below a second predetermined value lower than the first predetermined value, and actuating means responsive to receipt of the actuating signal to cause the external light system of the vehicle to be turned on.

2. External light actuating apparatus according to claim 1 also including time delay means to delay provision of the actuating signal for a predetermined time after the vehicle engine has started running.

3. External light actuating apparatus according to claim 1 also including time delay means to maintain provision of the actuating signal for a predetermined time after the vehicle engine has stopped running.

4. External light actuating according to claim 1 including means for rectifying the AC signal to provide a DC engine running signal.

5. External light actuating apparatus according to claim 1 wherein the external light system actuated comprises head lights and tail lights.

* * * * *